United States Patent
Drexler

(10) Patent No.: US 6,290,130 B1
(45) Date of Patent: Sep. 18, 2001

(54) ANTI-COUNTERFEIT AUTHENTICATION METHOD FOR OPTICAL MEMORY CARDS AND HYBRID SMART CARDS

(75) Inventor: Jerome Drexler, Los Altos Hills, CA (US)

(73) Assignee: Drexler Technology Corporation, Mountain View, CA (US)

( * ) Notice: Subject to any disclaimer, the term of this patent is extended or adjusted under 35 U.S.C. 154(b) by 0 days.

(21) Appl. No.: 09/548,703

(22) Filed: Apr. 13, 2000

(51) Int. Cl.⁷ ....................................... G06K 7/10
(52) U.S. Cl. ............................. 235/454; 235/488
(58) Field of Search ....................... 235/380, 454, 235/487, 488, 494, 455, 449, 450, 493; 705/44

(56) References Cited

U.S. PATENT DOCUMENTS

| | | | |
|---|---|---|---|
| 4,312,938 | 1/1982 | Drexler et al. | 430/496 |
| 4,745,268 | 5/1988 | Drexler | 235/487 |
| 4,754,128 | 6/1988 | Takeda et al. | 235/488 |
| 4,788,129 * | 11/1988 | Bouldin et al. | 430/273 |
| 4,863,819 | 9/1989 | Drexler et al. | 430/14 |
| 4,983,817 * | 1/1991 | Dolash et al. | 235/462 |
| 5,300,764 | 4/1994 | Hoshino et al. | 235/487 |
| 5,401,960 * | 3/1995 | Fisun et al. | 250/271 |
| 5,932,865 | 8/1999 | Drexler | 235/487 |
| 5,971,276 * | 10/1999 | Sano et al. | 235/462.01 |

* cited by examiner

Primary Examiner—Michael G. Lee
Assistant Examiner—April Nowlin
(74) Attorney, Agent, or Firm—Thomas Schneck; Gina McCarthy

(57) ABSTRACT

The invention is a method and system for inhibiting the use of counterfeited optical memory cards and hybrid smart cards that use Drexon™ reflective laser recordable media for recording and storing data. Use of such counterfeit versions of Drexon™ optical memory cards can be inhibited by use of two or more LEDs, or semiconductor lasers, which would focus their light beams on the apparent Drexon™ optical memory stripe. Using photodetectors, the reflectivity of the Drexon™ stripe would be measured at two or more wavelengths including the visible and the infrared so as to identify the Drexon™ media, a silver particle-based material which has a unique reflectivity vs. wavelength characteristic. If the relative reflectivities match those predetermined characteristics of the Drexon™ media, the card would not be rejected; otherwise it would be rejected.

13 Claims, 3 Drawing Sheets

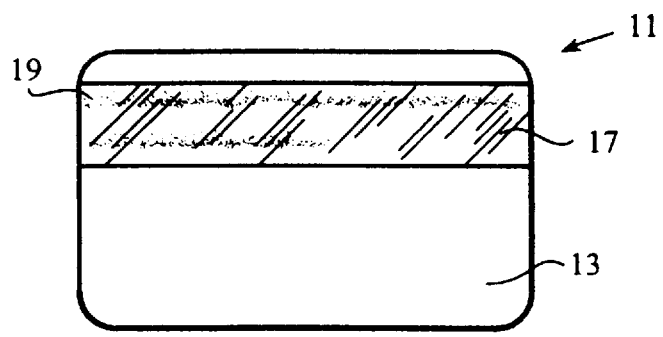
FIG._1
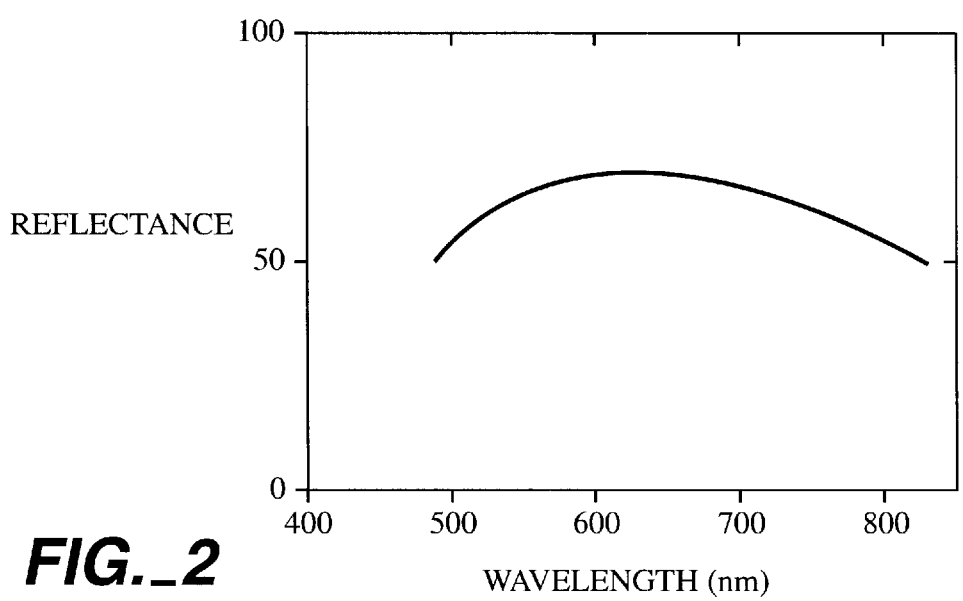
FIG._2

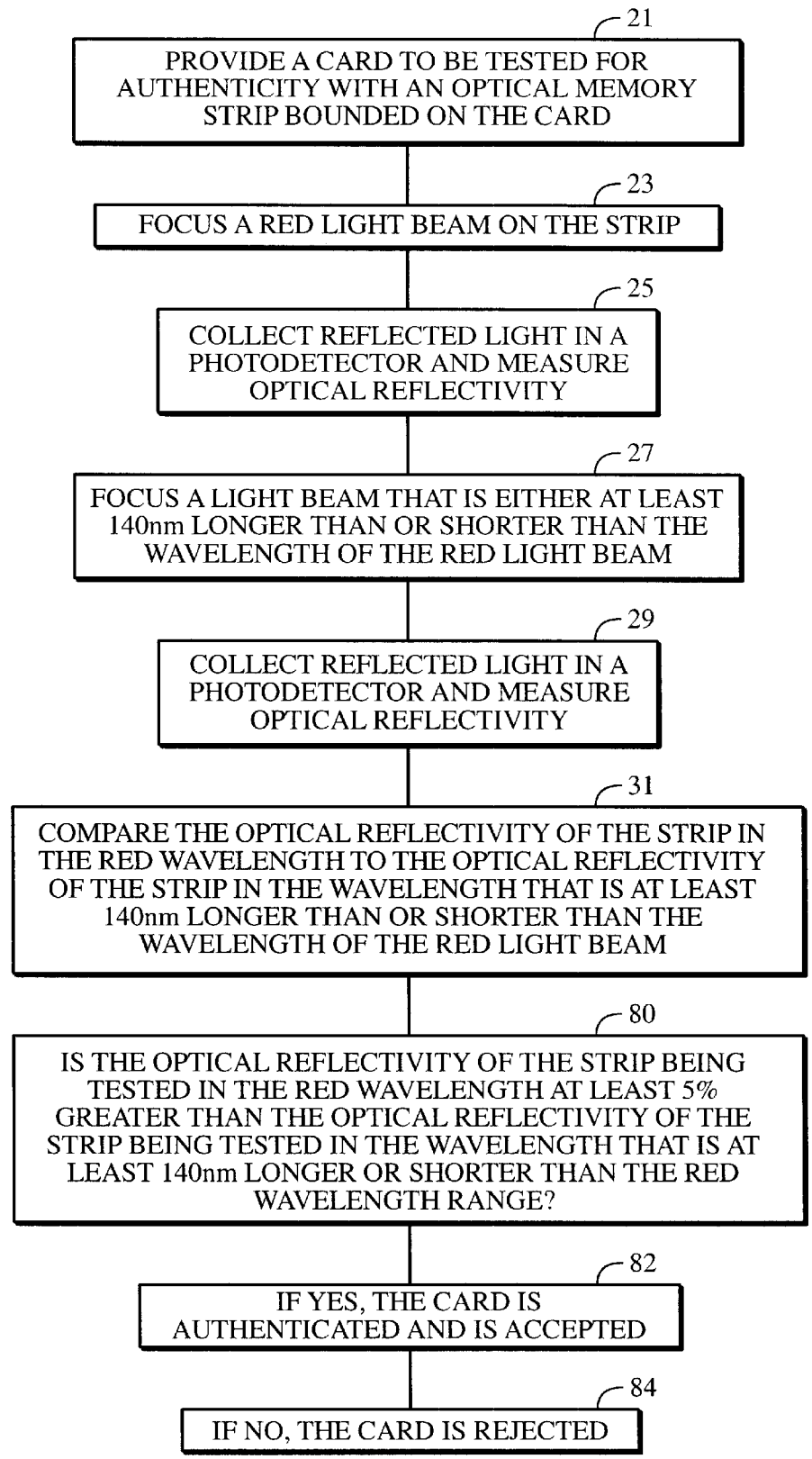
FIG._3

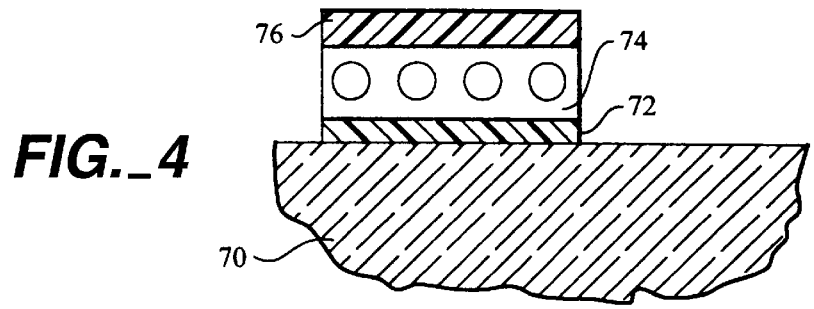
FIG._4
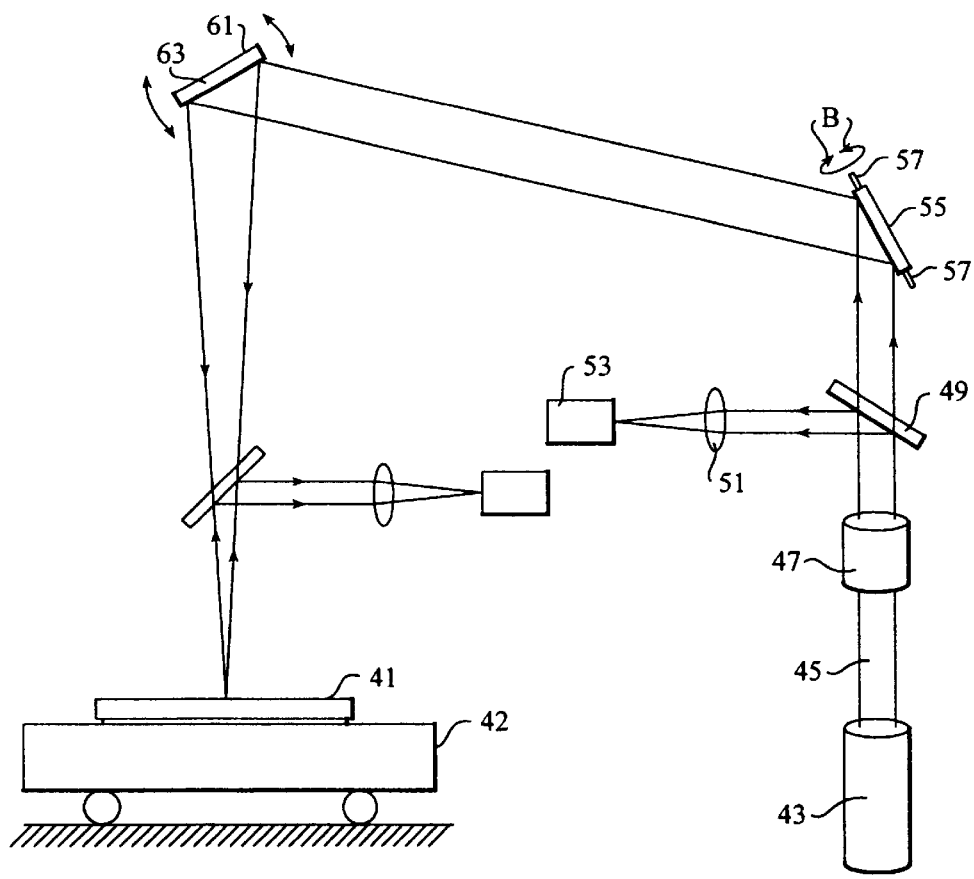
FIG._5

ANTI-COUNTERFEIT AUTHENTICATION METHOD FOR OPTICAL MEMORY CARDS AND HYBRID SMART CARDS

TECHNICAL FIELD

The present invention relates to optical memory card security methods and apparatus.

BACKGROUND ART

Optical memory cards are known. Such cards may be distinguished from electronic or flash memory cards which rely upon non-volatile integrated circuit chips to retain data. Optical memory cards contain laser recording material to contain data, similar to recordable compact disks called CD-R's and may, or may not, also contain an integrated circuit chip. When an optical memory card also contains an integrated circuit chip it is known as a hybrid smart card. Providing security for optical data cards is an important consideration.

U.S. Pat. No. 5,932,865 to Drexler teaches a method for inhibiting the counterfeiting of electronic cash cards by bonding an optical memory stripe to the card, recording optical validation data on a specific location on the optical memory stripe by forming a plurality of spots in a surrounding field of reflective layer, reading the optical data on the stripe by detecting an optical reflective contrast between the surrounding field and the recorded spots and comparing the data to a reference.

U.S. Pat. No. 4,863,819 to Drexler teaches an optical data card comprising a film substrate layer, a highly reflective layer and an optical storage layer with a pattern of clear and partially clear data marks revealing reflectivity in the underlying reflective layer. The reflective layer is highly reflective at a read beam wavelength in the red or near infrared range and less reflective at actinic wavelengths either in the blue/green range or in the ultraviolet range.

U.S. Pat. No. 4,312,938 to Drexler teaches a method for making a broadband laser recording and storage data medium by a stepwise procedure involving normal photographic development of an exposed photosensitive silver-halide emulsion followed by fogging and silver diffusion transfer.

U.S. Pat. No. 4,745,268 to Drexler teaches the use of two optical systems to read visually readable information and laser recorded machine readable information on an information card.

U.S. Pat. No. 4,754,128 to Takeda et al. teaches an optical card comprising a card substrate and a light reflective layer on the card substrate. The light reflective layer comprises an optical higher reflection layer and an optical lower reflection layer. The optical higher reflection layer has an optical information pattern formed.

U.S. Pat. No. 5,300,764 to Hoshino et al. teaches an optical identification label consisting of an area of a hologram or diffraction grating which is transparent to visible light but reflects incident light with a specific reflective directivity. By identifying the reflectivity directivity, it is possible to identify the authenticity of the label and the object to which the identification label is affixed.

The largest users of optical memory cards are governmental agencies. Such cards are used by the Immigration and Naturalization Service (INS) for its Permanent Resident Card, also known as the "Green Card", and by the U.S. Department of State for its LaserVisa card used by Mexican citizens who make frequent visits to the USA. All of these cards use the Drexon™ media for laser recording of data, a registered trademark of Drexler Technology Corporation for a silver particle-based material. There is a concern about attempts to counterfeit these optical memory cards using reflective laser recording media other than Drexon™ media. Imitation laser recordable materials typically would use either vacuum deposited metal films or laser beam sensitive dyes.

It is the object of the present invention to devise a method and apparatus to inhibit the counterfeiting of Drexon™-based optical memory cards and hybrid smart cards.

SUMMARY OF THE INVENTION

The above object has been met by utilizing the unique optical reflectivity characteristics that Drexon™ material exhibits at different wavelengths. Drexon™, a laser recording material, is made up of microspheric silver particles in a gelatin matrix and has known optical reflectivity at various wavelengths. An optical memory card containing an optical memory stripe or a hybrid smart card containing an optical memory stripe and an integrated circuit chip are proven to be authentic or nonauthentic by testing the optical properties of the optical memory stripe on the card. If the optical memory stripe of the card being tested exhibits the same optical reflectivity characteristics that silver particle-based laser recording material Drexon™ does at different wavelengths, the card is authentic. Otherwise, it is rejected.

Specifically, the reflective substrate being tested is illuminated with a beam of light generally in the red wavelength range. The optical reflectivity of the substrate is measured and recorded. The substrate is then illuminated with light of a different wavelength. If the optical reflectivity characteristics at both wavelengths displayed by the substrate being tested match the optical reflectivity characteristics of the silver particle-based laser recording material Drexon™ at the same wavelengths, the substrate is authentic and the card is accepted. This way, if a counterfeiter uses a material other than silver particle-based laser recording material Drexon™ in the optical recording strip, the unique reflectivity characteristics of Drexon™ will not be exhibited and the card will be rejected.

BRIEF DESCRIPTION OF THE DRAWINGS

FIG. 1 is a top plan view of an optical memory card in accord with the present invention.

FIG. 2 is a curve that shows the optical reflectivity (reflectance) of the material Drexon™ versus the wavelength of the laser beam.

FIG. 3 is a flow chart showing steps in the method of the present invention.

FIG. 4 is a side elevation detail of the card of FIG. 1.

FIG. 5 is a plan view of optical apparatus for in-situ writing on the optical recording material of the card of FIG. 1.

BEST MODE FOR CARRYING OUT THE INVENTION

With reference to FIG. 1, an optical memory card 11 is illustrated having a size common to most credit cards. The card's substrate material 13 is a dielectric, usually a plastic. Polycarbonate is preferred. Alternatively, the card carries a chip inside as shown in U.S. Pat. Nos. 5,365,655 and 5,134,773. The surface of the finish of the base for the card should have low specular reflectivity, preferably less than 10%.

Substrate 13 carries strip or patch 17. The strip is typically 35 mm or 16 mm wide and extends the length of the card. Alternatively, the strip or patch may have other sizes and orientation. The strip is relatively thin, typically 60–200 microns, although this is not critical. Strips or patches of laser recording material may be applied to both sides of card 11. The strip or patch may be applied to the card by any convenient method which achieves flatness.

The strip or patch 17 is adhered to the card with an adhesive and is covered by a transparent laminating sheet 76 seen in FIG. 4 which serves to keep strip 17 flat, as well as protecting the strip from dust and scratches. Sheet 76 is a thin, transparent plastic sheet laminating material or a coating such as a transparent lacquer. The material is preferably made of polycarbonate plastic.

The high resolution laser recording material 74 which forms strip 17 is a reflective recording materials which has been developed for use as a direct-read-after-write (DRAW) material. Materials which are preferred are those having a reflectivity of 25 to 55% and low power recording capability. Typical recording media are described in U.S. Pat. Nos. 4,314,260; 4,298,684; 4,278,758; 4,278,756 and 4,269,917, all assigned to the assignee of the present invention.

The laser recording material which is selected should be compatible with the laser which is used for writing on it. Some materials are more sensitive than others at certain wavelengths. Good sensitivity to near infrared light is preferred because near infrared is affected least by scratches and dirt on the transparent laminating sheet. The selected recording material should have a favorable signal-to-noise ratio and form high contrast data bits with the read/write system with which it is used.

The material should not lose data when subjected to temperatures of about 180° F. (82° C.) for long periods. The material should also be capable of recording at speeds of at least several thousand bits/second. This generally precludes the use of materials that require long heating times or that rely on slow chemical reactions in the presence of heat, which may permit recording of only a few bits/second. A large number of highly reflective laser recording materials have been used for optical data disk applications.

In accord with the present invention, a silver particle-based laser recording material having variable reflectivity over an optical spectrum is used. Drexon™, the preferred recording material, consists of a thin, organic film or colloidal matrix that contains a thin layer of silver particles. Drexon™ is produced by a chemical silver diffusion transfer of photographic emulsions, creating a reflective recording surface. A method of making Drexon™ and the Drexon™ material are described in U.S. Pat. Nos. 4,312,938 and 4,284,716.

A unique characteristic of the silver particle-based laser recording material is that it displays different reflectivity values at different wavelengths. For example, at near infrared wavelengths Drexon™ has a lower reflectivity than in the red wavelength. In contrast, a sputtered electrically conducting metal coating would have a relatively constant reflectivity over the same range of wavelengths.

FIG. 2 illustrates how the reflectance of silver particle-based laser recording material Drexon™ varies with wavelength. Visible light has a wavelength of approximately 380 nm to 700 nm. Generally, red light has a wavelength range of approximately 630 nm to 670 nm. Infrared light has a wavelength range of 780 nm or longer. As seen in the reflectance curve of FIG. 2, within the wavelength range of the red light the value of reflectance stays fairly constant. Wavelengths at 570 nm or shorter or 700 nm or longer show a noticeable drop in reflectance. At values approximately 140 nm shorter than the wavelength range of red light and approximately 140 nm longer than the wavelength range of red light the reflectance value typically decreases by more than 5%.

The method of authenticating a card, i.e. determining whether the card contains silver particle-based laser recording material Drexon™ in its optical memory strip is summarized in FIG. 3. Referring to the flow chart, in step 21, a card to be tested for validity is provided. The card has an optical memory strip bonded to it. Then in step 23, a red light beam is focused onto the strip. The source of the red light beam is a helium-neon gas laser, a laser diode or a light emitting diode (LED). In step 25, the reflected light beam is collected in a photodetector and the optical reflectivity is measured. In step 27, at least one light beam outside of the red light wavelength range is focused onto the strip using an LED or semiconductor laser. The light beam may be of any wavelength which when focused on a silver particle-based laser recording material Drexon™ strip results in a reflectance value that is less than the reflectance value exhibited when a red light beam is focused on the silver particle-based laser recording material Drexon™ strip. FIG. 2 indicates the wavelengths of light which when focused on the Drexon™ strip cause a decrease in the reflectance of the strip when compared to the red wavelength range. Preferably, a light beam having a wavelength that is either at least 140 nm longer than or shorter than the wavelength of the red light beam is focused onto the strip being tested. In step 29, the reflected light beam is collected in a photodetector and the optical reflectivity is measured. In step 31, the reflectivity in the red wavelength of the strip being tested is compared with the reflectivity in the wavelength that is 140 nm longer or shorter than the red wavelength of the strip being tested. A decision 80 is then made as to whether the card is valid, i.e. has a strip containing silver particle-based laser recording material Drexon™. If the optical reflectivity of the substrate being tested in the red wavelength is at least 5% greater than the optical reflectivity of the substrate being tested in the wavelength that is at least 140 nm longer or shorter than the red wavelength range, the card is accepted as indicated in step 82. This occurs when the strip being tested contains silver particle-based laser recording material Drexon™, as is indicated by the curve in FIG. 2 when the second light beam has a wavelength that is at least 140 nm longer than or shorter than the red wavelength. If the reflectance is not at least 5% greater in the red wavelength the card is rejected as indicated in step 84. In the validation process, more than two light beams of varying wavelengths may be focused on one substrate. The reflectivity of the substrate at different wavelengths may be measured sequentially.

From FIG. 2, it is clear that wavelengths other than those at least 140 nm longer than or shorter than the red wavelength range may be used. However, these other wavelengths may result in a change in reflectance of the silver particle-based laser recording material Drexon™ surface that is not as noticeable. The wavelength that is at least 140 nm longer or shorter than the red wavelength is preferred as it displays a more noticeable drop in reflectance when compared to the reflectance in the red wavelength range than does a wavelength that is not at least 140 nm longer or shorter. However, a wavelength that is not at least 140 nm longer or shorter than the wavelength of red light may be used, but a more precise measurement of reflectivity will be required which may require more expensive equipment. The card that is accepted displays the same unique reflectivity qualities that silver particle-based laser recording material Drexon™ does at different wavelengths.

Alternatively, the strip may contain prerecorded data. Data is recorded by forming microscopic data spots in the field of the reflective layer itself, thereby altering the reflectivity in the data spot. Data is read by detecting the optical reflective contrast between the surrounding reflective field of unrecorded areas and the recorded spots. Spot reflectivity of less than half the reflectivity of the surrounding field produces a contrast ratio of at least two to one, which is more than sufficient contrast for reading. Reflectivity of the strip field of about 40% to 50% is preferred with reflectivity of a spot in the reflective field being less than 10%, thus creating a contrast ratio of four or five to one.

Data strip 17 is intended to provide a data record and has digital information indicia. Digital machine readable data is written in individual tracks extending in a longitudinal direction, as indicated by the spot patterns 19 and are usually read in reflection, rather than in transmission. The information density is great because each of the spots in the spot pattern is approximately 0.6 to 3 microns in diameter with a typical spacing of about 0.6 to 3 microns between spots. The spots are recorded by a laser in the usual way, for example, as shown in U.S. Pat. No. 4,278,756 to Bouldin et al.

With reference to FIG. 4, a card substrate 70 carries an optional secondary substrate 72 which is a thin flexible material, only a few mils thick carrying a laser recording material 74. The secondary substrate 72 is adhered to the primary substrate 70 by means of an adhesive or sticky substance. The laser recording material may be any of the materials previously discussed. However, in accord with the present invention, a silver particle-based laser recording material having variable reflectivity as a function of wavelength such as Drexon™ is used. A transparent protective coating or cover 76 is applied over the laser recording material.

A laser writing apparatus is illustrated in FIG. 5 which illustrates the side view of the lengthwise dimension of the medium of FIG. 1 consisting of a data strip having digital information in combination with microscopic data spot information on a card. The data strip portion 41 of the medium is usually received in a movable holder 42 which brings the strip into the trajectory of a laser beam. A laser light source 43, preferably a pulsed semiconductor laser of near infrared or red wavelength emits a beam 45 which passes through collimating and focusing optics 47. The beam is sampled by a beam splitter 49 which transmits a portion of the beam through a focusing lens 51 to a photodetector 53. The detector 53 confirms laser writing. The beam is then directed to a first servo controlled mirror 55 which is mounted for rotation along axis 57 in the direction indicated by arrows B. The purpose of the mirror 55 is to find lateral edges of the data strip in a coarse mode of operation and then in a fine mode of operation identify data paths or sites which exist predetermined distances from the edges.

From mirror 55, the beam is directed toward a mirror 61. The mirror is mounted for rotation at pivot 63. The purpose of the mirror 55 is for fine control of motion of the beam along the length of the data strip. Coarse control of the lengthwise portion of the data strip relative to the beam is achieved by motion of the movable holder 42. The position of the holder may be established by a linear motor and used by a closed loop position servo system of the type used in magnetic disk drives. Reference position information in the form of reflective data tracks is prerecorded or pre-formatted on the card so that position error signals may be generated and used as feedback in motor control. Upon reading one data path, the mirror 55 is slightly rotated. The motor moves holder 42 lengthwise so that the path can be read again, and so on.

For writing microscopic data spots, mirror 55 is used to identify sites at predetermined distances from the edges. Mirror 55 moves the scanning beam lengthwise from site to site. Upon reading one row of sites, mirror 55 is slightly rotated. Within a site, mirrors 55 and 61 cooperate to move the beam in either a zig-zag pattern or a raster-like pattern. Laser data spots are written at designated locations within a data track. When one site is written, mirrors 55 and 61 move the beam to the next site.

As light is scattered and reflected from data spots in the laser recording material, the percentage of reflected light from the incident beam changes relative to surrounding material where no spots exist. The incident laser beam should deliver sufficient laser energy to the surface for the recording material to create microscopic data spots in the data writing mode, but should not cause significant disruption of the surface so as to cause difficulty in the lower beam power data and reading mode. The wavelength of the laser should be compatible with the recording material to achieve this purpose. In the read mode, power is approximately 5% to 10% of the recording or writing power.

Differences in reflectivity between a data spot and surrounding material are detected by well-known methods.

In accord with the present invention, in authenticating the card, i.e. determining whether the substrate contains silver particle-based laser recording material Drexon™, the reflectivity of the material surrounding a data spot, or the test spot, is measured at different wavelengths as described above. The reflectivity of the test spot at the red wavelength is compared to the reflectivity of the test spot at one or more wavelengths that exhibit a decrease in reflectance when compared to the reflectance of silver particle-based laser recording material Drexon™ at the red wavelength range. Preferably a light beam with a wavelength at least 140 nm longer than or shorter than the wavelength of the red light illuminates the surface being tested. Then, if the reflectivity in the red wavelength range of the substrate being tested is at least 5% greater than the reflectivity in the other range, the card is rendered authentic.

What is claimed is:

1. A method of authentication of an optical memory card claimed to utilize a silver particle-based laser recording material having a variable reflectivity with wavelength comprising, illuminating a surface of a laser recording media with at least two incident light beams where at least one first light beam is within a wavelength range of 630 nm to 670 nm and other light beam has a wavelength such that when reflected from said material having variable reflectivity results in an optical reflectivity value that is less than an optical reflectivity value that results when the first beam is reflected from said material having said reflectivity variable with wavelength;

reflecting the light beams from said surface being tested so as to collect the light in a photodetector;

measuring the optical reflectivity of said surface being tested at at least two wavelengths;

comparing the optical reflectivity of said at least two wavelengths; and accepting the optical memory card as an authentic card containing said laser recording material having said variable reflectivity with wavelength if the optical reflectivity in the 630 nm to 670 nm range is greater than the optical reflectivity of said other wavelength.

2. The method of claim 1 wherein said first beam is red in color.

3. The method of claim 1 wherein said other light beam has a wavelength shorter than 550 nm and the optical reflectivity in the 630 nm to 670 nm range is at least 5% greater.

4. The method of claim 1 wherein said other light beam has a wavelength longer than 730 nm and the optical reflectivity in the 630 nm to 670 nm range is at least 5% greater.

5. The method of claim 1 wherein accepting the optical memory card as an authentic card containing said laser recording material having variable reflectivity occurs if the optical reflectivity in the 630 nm to 670 nm range is at least 5% higher than the optical reflectivity of said other wavelength.

6. The method of claim 1 where test spots on the laser recording material having said variable reflectivity with wavelength that are used to measure reflectivity are at different locations.

7. The method of claim 1 wherein a source of said at least two incident light beams is a laser diode or a light emitting diode.

8. The method of claim 1 where the source of the first light beam is a helium-neon gas laser.

9. The method of claim 1 where the measuring of reflectivity of said at least two wavelengths occurs sequentially.

10. The method of claim 1 where only one photodetector is used to detect the various wavelength reflected light beams.

11. The method of claim 1 where in an integrated circuit chip is also mounted on the optical memory card.

12. A method of authentication of an optical memory card claimed to utilize a silver particle-based laser recording material having variable reflectivity with wavelength comprising, illuminating the surface of the laser recording media with at least two incident light beams from laser diodes or light emitting diodes (LEDs) separated in wavelengths by at least 140 nanometers and where at least one light beam is red in color in the wavelength range of 640 nm to 670 nm;

reflecting the light beams from said surface being tested so as to collect the light in a photodetector;

measuring the optical reflectivity of said surface being tested at least two wavelengths at least 140 nm apart and where one of the wavelengths falls within the range of 640 nm to 670 nm;

comparing the optical reflectivity anywhere within the range of 640 nm to 670 nm with the optical reflectivity at wavelengths at least 140 nm longer and/or at least 140 nm shorter; and accepting the optical memory card as an authentic card containing said laser recording material having said variable reflectivity with wavelength if the optical reflectivity in the 640 nm to 670 nm range is at least 5% higher than the optical reflectivity at wavelengths either at least 140 nm longer or 140 nm shorter.

13. The method of claim 12 wherein an integrated circuit chip is also mounted on the optical memory card.

* * * * *